US010969503B2

(12) United States Patent
Nakai et al.

(10) Patent No.: US 10,969,503 B2
(45) Date of Patent: Apr. 6, 2021

(54) SENSITIVITY CORRECTION METHOD AND PHOTON COUNTING DETECTOR

(71) Applicant: Canon Medical Systems Corporation, Otawara (JP)

(72) Inventors: Hiroaki Nakai, Nasushiobara (JP); Hiroaki Miyazaki, Otawara (JP); Tooru Kato, Nasushiobara (JP); Mikihito Hayashi, Otawara (JP); Naoki Sugihara, Nasushiobara (JP)

(73) Assignee: Canon Medical Systems Corporation, Otawara (JP)

( * ) Notice: Subject to any disclaimer, the term of this patent is extended or adjusted under 35 U.S.C. 154(b) by 63 days.

(21) Appl. No.: 16/540,147

(22) Filed: Aug. 14, 2019

(65) Prior Publication Data

US 2020/0064498 A1    Feb. 27, 2020

(30) Foreign Application Priority Data

Aug. 22, 2018    (JP) .............................. JP2018-155490

(51) Int. Cl.
*H01L 27/146* (2006.01)
*G01T 1/24* (2006.01)

(52) U.S. Cl.
CPC .................................. *G01T 1/244* (2013.01)

(58) Field of Classification Search
CPC .......... G01T 1/244; G01T 1/24; G01T 1/2018
See application file for complete search history.

(56) References Cited

U.S. PATENT DOCUMENTS

2016/0095560 A1\* 4/2016 Nakai .................. A61B 6/4241
378/5

OTHER PUBLICATIONS

Wong, W. H., et al., "A Scintillation Detector Signal Processing Technique with Active Pileup Prevention for Extending Scintillation Count Rates", IEEE Transactions on Nuclear Science, vol. 45, No. 3., Jun. 1998, pp. 838-842.
Barber, W. C., et al., "Photon-counting energy—resolving CdTe detectors for high-flux x-ray imaging", IEEE Nuclear Science Symposium conference record, NSS/MIC, 2010, pp. 3953-3955.

\* cited by examiner

*Primary Examiner* — Kiho Kim
(74) *Attorney, Agent, or Firm* — Oblon, McClelland, Maier & Neustadt, L.L.P.

(57) ABSTRACT

According to one embodiment, a sensitivity correction method includes acquiring count rates for respective pixels in a photon counting detector; preparing incident dose adjustment materials for the respective pixels based on the count rates for the respective pixels; and providing the incident dose adjustment materials in a surface of the photon counting detector.

14 Claims, 9 Drawing Sheets

SENSITIVITY CORRECTION METHOD AND PHOTON COUNTING DETECTOR

CROSS-REFERENCE TO RELATED APPLICATIONS

This application is based upon and claims the benefit of priority from prior Japanese Patent Application No. 2018-155490, filed Aug. 22, 2018, the entire contents of which are incorporated herein by reference.

FIELD

Embodiments described herein relate generally to a sensitivity correction method and a photon counting detector.

BACKGROUND

An X-ray detector (area detector) for use in X-ray computed tomography (CT) apparatuses, etc. varies sensitivity between its pixels. Nevertheless, a charge integrating detector as one example of such a detector for X-ray CT apparatuses excels in output linearity shown by each pixel in response to incident doses. When the charge integrating detector is adopted, therefore, its pixel-by-pixel sensitivity variations can be corrected through gain adjustment for the values obtained after the output measurements.

On the other hand, a photon counting detector (PCD) as another example of the X-ray detector gives deteriorated linearities depending on incident doses. For example, with a small amount of incident doses, its pixels show a good linearity of an output count rate (OCR) to an input count rate (ICR) of X-ray photons. More specifically, in the photon counting detector, a pixel having high sensitivity shows a linearity that is closer to the ideal linearity (OCR/ICR=1) in the portion corresponding to the small incident doses, as compared to the linearity shown by a pixel having low sensitivity.

However, with a large amount of incident doses, the photon counting detector suffers from saturation of the output count rate due to a so-called pulse pileup effects, which degrades each pixel's output linearity and makes a non-linear profile stand out. More specifically, as the input count rate increases, a pixel having high sensitivity degrades the linearity in the portion corresponding to the large incident doses, to a greater extent and from the lower (earlier) point in the input count rate than the linearity shown by a pixel having low sensitivity. Also, the output count rate for the pixel having high sensitivity reaches the saturation at a value lower than the output count rate for the pixel having low sensitivity.

As such, photon counting detectors, which involve poor linearities with a large amount of incident doses, are not suited for correction of pixel-by-pixel sensitivity variations through the gain adjustment.

DETAILED DESCRIPTION

According to a certain embodiment, a sensitivity correction method includes acquiring count rates for respective pixels in a photon counting detector; preparing incident dose adjustment materials for the respective pixels based on the count rates for the respective pixels; and providing the incident dose adjustment materials in a surface of the photon counting detector. With these features, the pixel-by-pixel sensitivity variations in the photon counting detector can be corrected.

Now, the sensitivity correction method and the photon counting detector according to certain embodiments will be described with reference to the drawings. The sensitivity correction method according to the embodiment may be employed for photon counting detectors. Note that the term "photon counting detector" used herein may be replaced with "photon counting X-ray detector", "photon counting y-ray detector", or the like. That is, the embodiment is applicable to any radiations as the detection subjects, including X-rays, y-rays, and so on, as long as such radiations would produce the pulse pileup effects upon incident on an area detector. The sensitivity correction method here involves providing sensitivity adjustment materials on the surface of a photon counting detector, and as such, the method may instead be called "manufacturing method", "assembling method", "processing method", etc. The photon counting detector here may be either an indirect conversion type constituted by scintillators and corresponding semiconductor detectors, or a direct conversion type constituted by compound semiconductors. Also, the photon counting detector may be adopted in X-ray CT apparatuses, or any general apparatuses requiring a radiation detector. Note that there are various types of X-ray CT apparatuses, such as a rotate/rotate-type (third-generation CT) which allows an X-ray tube and an X-ray detector to rotate around a subject as a unit, and a stationary/rotate-type (fourth-generation CT) which includes many X-ray detecting elements fixed and arrayed in a ring pattern and allows only an X-ray detector to rotate around a subject. The embodiments are applicable to any types. By way of example, the description of the embodiments will assume a photon counting detector to be adapted to detect X-rays, and an X-ray CT apparatus to be of the third-generation type.

Figure 1:
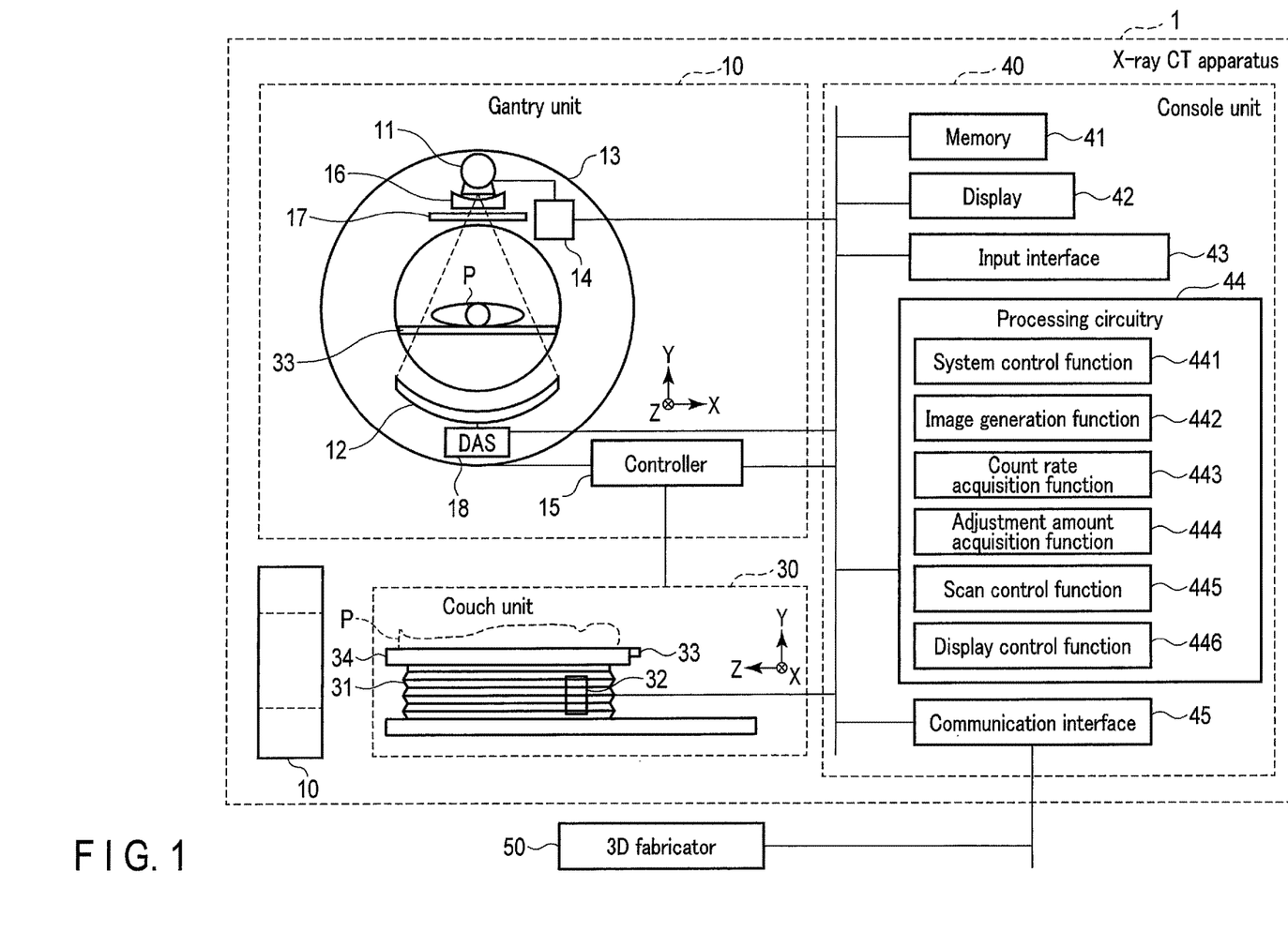
FIG. 1 is a block diagram showing a configuration of an X-ray CT apparatus including a photon counting detector according to a certain embodiment.
Figure 2:
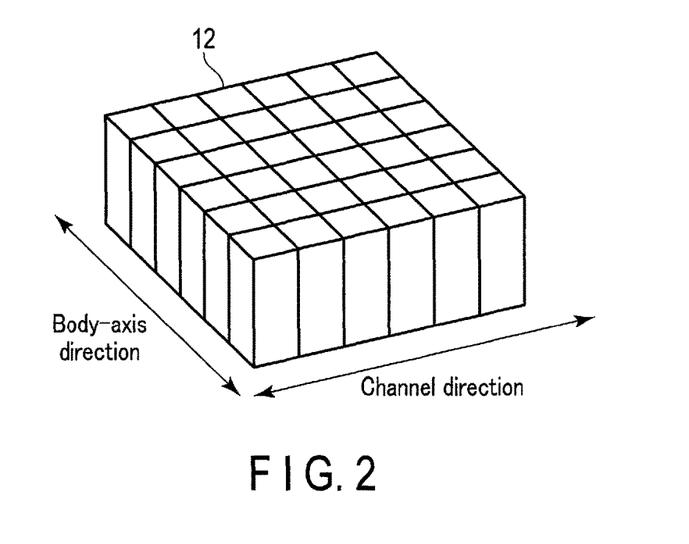
FIG. 2 is a perspective view for explaining a structure of the photon counting detector according to the embodiment.
Figure 3:
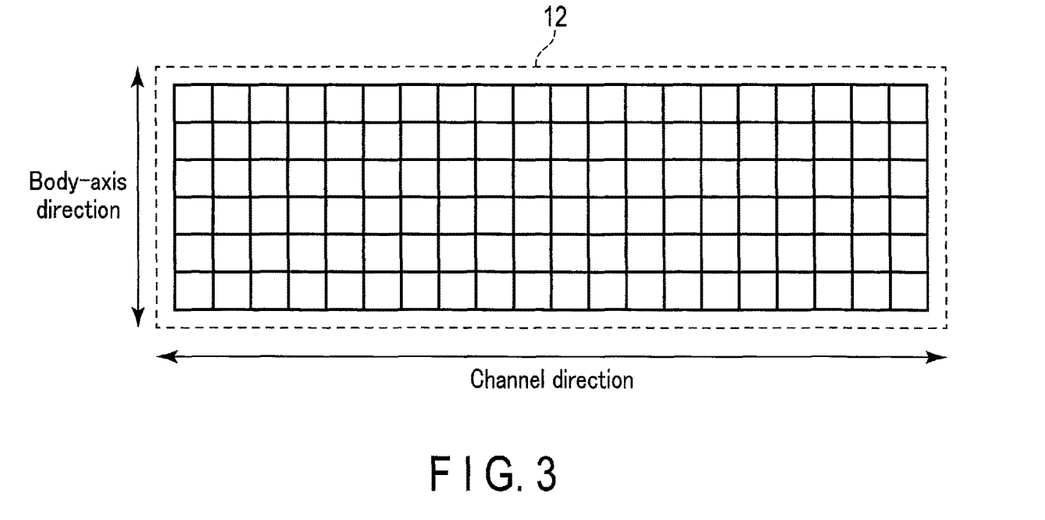
FIG. 3 is a plan view for explaining the structure of the photon counting detector according to the embodiment.

FIG. 1 is a block diagram showing an exemplary configuration of an X-ray CT apparatus including a photon counting detector according to one embodiment, and FIGS. 2 to 9 are schematic diagrams, etc. for the photon counting detector. An X-ray CT apparatus 1 causes an X-ray source with an X-raY tube 11 to emit X-rays toward a subject P, and detects the X-rays transmitted through the subject P at a photon counting detector 12. The X-ray CT apparatus 1 generates CT images for the subject P based on outputs from the photon counting detector 12. The X-ray source and the photon counting detector 12 constitute one example of an imaging system.

The X-ray CT apparatus 1 shown in FIG. 1 includes a gantry unit 10, a couch unit 30, and a console unit 40. The gantry unit 10 is a scanner unit having a configuration to perform X-ray CT imaging for the subject P. Note that, while FIG. 1 shows more than one member denoted by reference numeral 10, they are intended to show the front face and the side face of one gantry unit 10, respectively. The couch unit 30 is a unit for placing thereon a subject of X-ray CT imaging, i.e., the subject P, and moving it to a position where the X-ray CT imaging is carried out. The console unit 40 is a computer for controlling the gantry unit 10.

For example, the gantry unit 10 and the couch unit 30 are arranged in a CT examination room, and the console unit 40 is arranged in a control room that may be adjacent to the CT examination room. The console unit 40 may not have to be arranged in the control room. The console unit 40 may be arranged, for example, together with the gantry unit 10 and the couch unit 30 in the same room. In any case, the gantry unit 10, the couch unit 30, and the console unit 40 are communicably connected to one another either via fixed lines or wirelessly.

The gantry unit 10 includes the X-ray tube 11 and the photon counting detector 12, as well as a rotation frame 13, an X-ray high-voltage device 14, a controller 15, a wedge 16, an X-ray diaphragm (collimator) 17, and a data acquisition system (DAS) 18.

The X-ray tube 11 is a vacuum tube in which thermal electrons are emitted from a cathode (filament) to an anode (target) using a high-voltage application and a filament current supply from the X-ray high-voltage device 14 so that X-rays are generated. Examples of X-ray tubes available as the X-ray tube 11 include an X-ray tube of a rotating anode type, which is adapted to generate X-rays by emitting thermal electrons to a rotating anode. The X-rays generated at the X-ray tube 11 are shaped into a cone beam through the X-ray diaphragm 17, and emitted toward the subject P. The X-ray tube 11 and the X-ray diaphragm 17 constitute one example of an X-ray source.

The photon counting detector 12 detects the X-rays having emitted from the X-ray tube 11 and transmitted through the subject P, and outputs an electrical signal corresponding to the dose of the X-rays to the DAS 18. The photon counting detector 12 includes, for example, multiple rows of X-ray detecting elements. In each of the rows, plurality of X-ray detecting elements may be arranged in the channel direction along a single arc that centers on the focal point of the X-ray tube. As shown in, for example, FIGS. 2 and 3, the photon counting detector 12 has an array structure in which these multiple rows, each including the X-ray detecting elements in the channel direction, are arranged in the body-axis direction (row direction). As such, the photon counting detector 12 may be understood as a 2D array detector (area detector). The body-axis direction may instead be called a slice direction or a Z-axis direction. FIG. 1 shows the Z-axis direction. The term "plurality of X-ray detecting elements" used herein may be replaced with "plurality of pixels", and the term "X-ray detecting element" may be replaced with "pixel".

Figure 4:
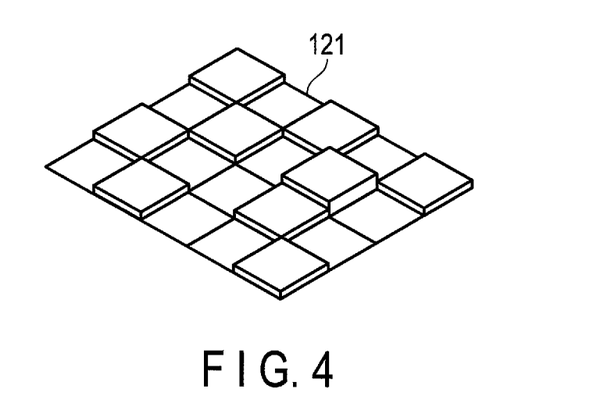
FIG. 4 is a perspective view for explaining one example of incident dose adjustment materials according to the embodiment.

The photon counting detector 12 includes film-like incident dose adjustment materials 121 as shown in, for example, FIG. 4, which may have different thicknesses for the respective pixels and which are provided on the respective radiation incident sides of these pixels. The photon counting detector 12 may instead, partially, or additionally include incident dose adjustment materials 121 as shown in, for example, FIG. 5, which may have different opening ratios for the respective pixels and which are provided on the respective radiation incident sides of these pixels.

The incident dose adjustment materials 121 may form the surface of the photon counting detector 12 and may be based on, for example, count rates for the corresponding, respective pixels. Thus, the photon counting detector 12 here has, in its surface, the incident dose adjustment materials 121 having respective adjustment amounts or adjustment capacities for the pixels for the sake of uniform sensitivity throughout the pixels. The incident dose adjustment materials 121 may together constitute at least one adjustment material sheet to be affixed onto the top part, or may be separately affixed to the top part without clearance in a manner similar to tiling. The incident dose adjustment materials 121 may be tailored each time, or may be picked up from the set of incident dose adjustment materials prepared in advance. The term "incident dose adjustment materials" used herein may be replaced with "X-ray dose adjustment materials", "dose adjustment materials", "sensitivity adjustment materials", "input count rate adjustment materials", "adjusters", "X-ray blocking materials", "X-ray absorbing materials", or the like. The aforementioned adjustment amounts are values to define the shapes, etc. of the incident dose adjustment materials 121 according to how much radiations are to be physically blocked. The term "adjustment amounts" may be replaced with another term such as "blocking amounts", "absorbing amounts", or "sizes". For the adjustment amounts, it is possible to discretionarily adopt values in thickness, sizes (opening dimensions) of respective opening windows 121w, opening ratios, and so on.

For example, when thickness values are adopted for the adjustment amounts, the incident dose adjustment materials 121 may have different thicknesses for the respective pixels as shown in FIG. 4. More specifically, among the incident dose adjustment materials 121, those facing the pixels having high sensitivity are thick, while those facing the pixels having low sensitivity are thin. That is, the sensitivities of the highly sensitive pixels are adjusted (lowered) to a predetermined low sensitivity. This predetermined low sensitivity may be, for example, the lowest one of the sensitivities of all the pixels in the photon counting detector 12, or may be a sensitivity selected from the group of sensitivities that account for a small proportion (several percent) of sensitivities of all the pixels from below. The latter case can avoid an event where the lowest sensitivity, which is excessively low, is set as the predetermined low sensitivity. The structure shown in FIG. 4 (uneven structure with concaves and convexes) attenuates the incident radiations by the X-ray absorbing amounts differing for the respective pixels, and allows the radiations to pass through. The structure may be formed from at least one light metal (X-ray absorbing material) such as aluminum, stainless steel, etc. Also, it is possible to form the structure of FIG. 4 from metal powder such as aluminum powder, stainless steel powder, etc., using, for example, a 3D fabricator 50 which may be a 3D printer. The structure of FIG. 4 could involve generation of undesired beam hardening as it attenuates low-energy X-rays through the thick portions; however, the structure can be easily manufactured as compared to the manufacture from heavy metals.

Figure 5:
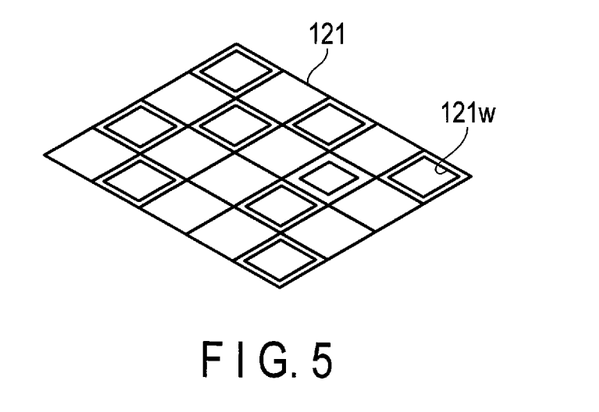
FIG. 5 is a perspective view for explaining another example of the incident dose adjustment materials according to the embodiment.

When sizes (or opening ratios) of opening windows are adopted for the adjustment amounts, the incident dose adjustment materials 121 may have the opening windows 121w differing in size for the respective pixels as shown in FIG. 5, while each having a thickness of about 1 mm. Note that the opening ratios are each obtained by (opening window size/pixel size)×100[%], and proportional to the size of the corresponding opening window. That is, when an opening window is wide, the opening ratio is large. When an opening window is narrow, the opening ratio is small. As such, the size of the opening window 121w being wide or narrow can be rephrased as the opening ratio being large or small. For the sake of simplification, the description will use the size of each opening window 121w as an example. More specifically, when the sizes of the opening windows are adopted for the adjustment amounts, the opening windows 121w in the incident dose adjustment materials 121 facing the pixels having high sensitivity are narrow, while the opening windows 121w in the incident dose adjustment materials 121 facing the pixels having low sensitivity are wide. That is, the sensitivities of the highly sensitive pixels are adjusted (lowered) to a predetermined low sensitivity. The predetermined low sensitivity here is as described above. The structure shown in FIG. 5 (mesh structure) allows the incident radiations to pass through the opening windows 121w differing in opening dimensions for the respective pixels. This structure may be formed from at least one heavy metal (X-ray blocking material) such as tungsten, molybdenum, lead, etc. Also, it is possible to form the structure of FIG. 5 from metal powder such as tungsten powder, molybdenum powder, etc., using, for example, the 3D fabricator 50. The structure of FIG. 5 may be provided without use of the 3D fabricator 50 but provided through the process of, for example, punching a hard lead plate having a thickness of about 1 mm. When such a punching process is employed, it is preferable to prepare multiple pieces of incident dose adjustment materials 121 and affix them in a manner similar to tiling, so that the structure will not involve accumulation of errors attributable to the distortion by punching actions. The structure of FIG. 5 might require more attention and steps for its manufacture as compared to the manufacture from light metals; however, the structure can advantageously eliminate the potential energy shift since it allows the X-rays to pass through the opening windows 121w.

Figure 6:
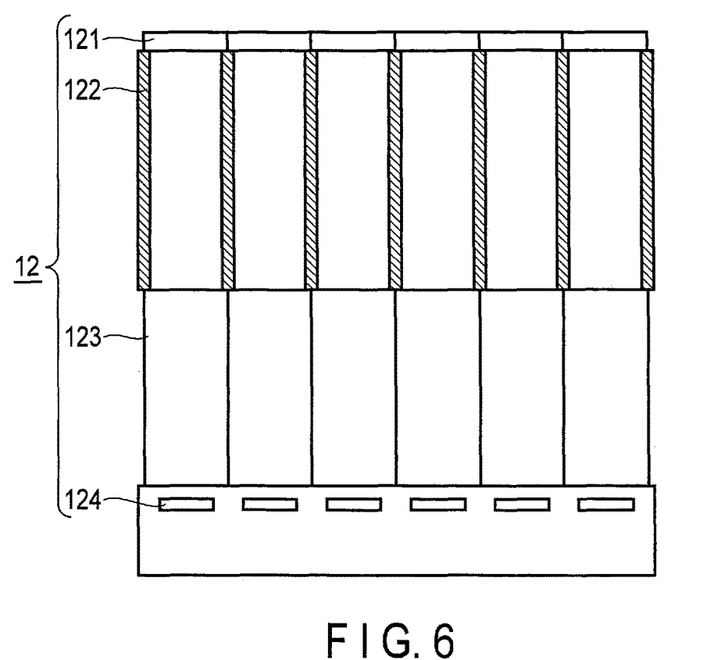
FIG. 6 is a schematic diagram for explaining one exemplary arrangement of the incident dose adjustment materials in the photon counting detector according to the embodiment.
Figure 7:
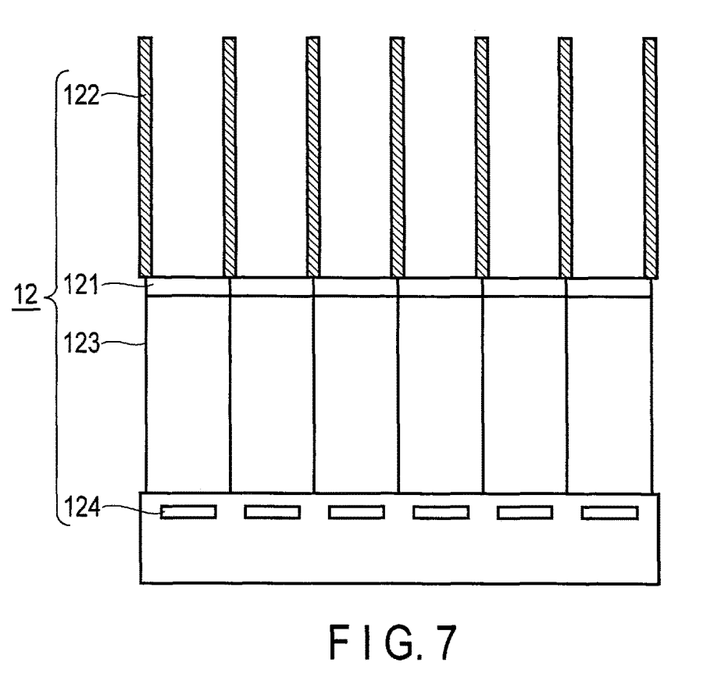
FIG. 7 is a schematic diagram for explaining one exemplary arrangement of the incident dose adjustment materials in the photon counting detector according to the embodiment.
Figure 8:
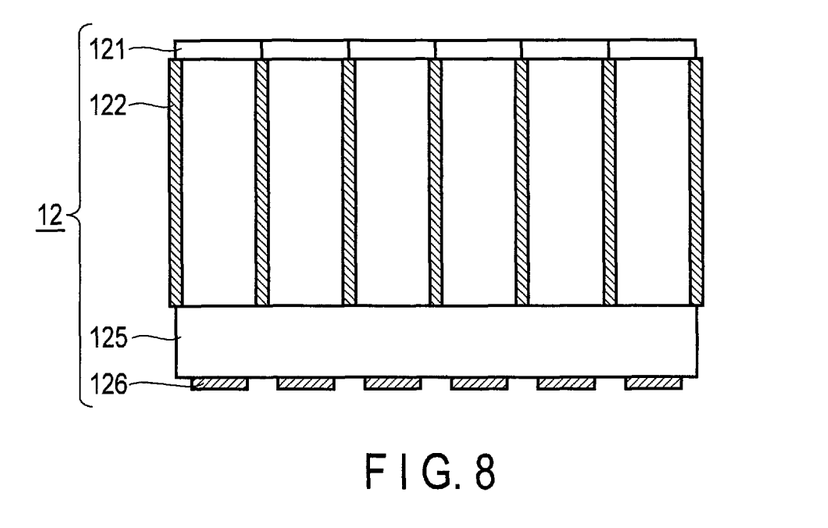
FIG. 8 is a schematic diagram for explaining one exemplary arrangement of the incident dose adjustment materials in the photon counting detector according to the embodiment.
Figure 9:
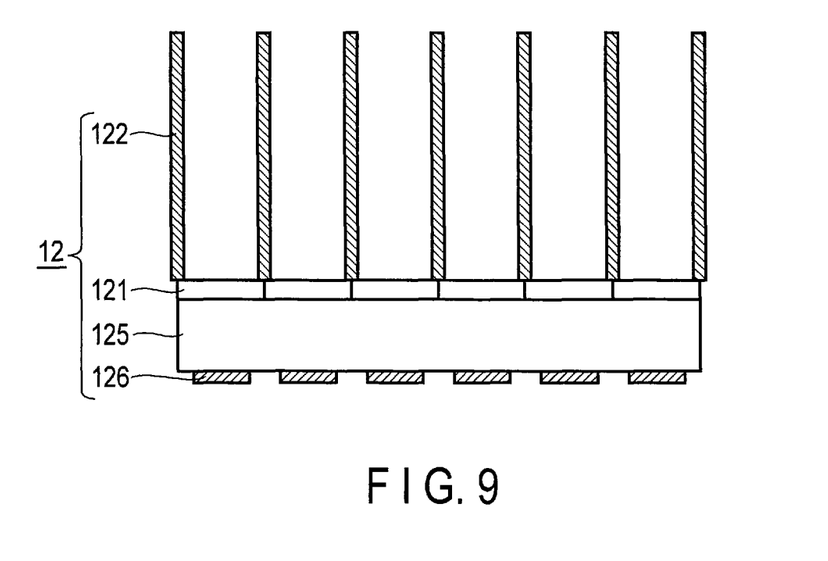
FIG. 9 is a schematic diagram for explaining one exemplary arrangement of the incident dose adjustment materials in the photon counting detector according to the embodiment.

The photon counting detector 12 may be an indirect conversion type detector including the incident dose adjustment materials 121, collimators 122, a scintillator array 123, and an optical sensor array 124 as shown in, for example, FIG. 6 or FIG. 7. The scintillator array 123 includes multiple scintillators with scintillator crystals which output fluorescence of the photon quantity corresponding to an incident X-ray dose. The collimators 122 are provided on the X-ray incident-side face of the scintillator array 123, and each include an X-ray shielding plate that has a function of absorbing scattered X-rays. The collimators 122 may be called a grid. The optical sensor array 124 has a function to generate electrical signals having a charge quantity according to the fluorescent energy from the scintillators, and includes optical sensors which may be, for example, photodiodes, silicon photomultipliers (SiPMs), or the like. The generated electrical signals are charge pulses. Within the detector of such an indirect conversion type, the scintillator array 123 and the optical sensor array 124 constitute multiple X-ray detecting elements (multiple pixels), and each scintillator and its corresponding optical sensor constitute an X-ray detecting element (pixel). The incident dose adjustment materials 121 may be provided on the collimators 122 in the surface of the photon counting detector 12, as shown in FIG. 6. The incident dose adjustment materials 121 may be provided between the group of pixels and the group of collimators 122 in the surface of the photon counting detector 12, as shown in FIG. 7. Note that the photon counting detector 12 may instead be a direct conversion type detector (semiconductor detector) including the incident dose adjustment materials 121, collimators 122, and a semiconductor element 125 as shown in, for example, FIG. 8 or FIG. 9. These collimators 122 are of similar configurations to the collimators 122 in the indirect conversion type detector described above. The semiconductor element 125 is adapted to convert incident X-rays into electrical signals and output the electrical signals from applicable electrodes 126. These electrical signals are charge pulses. Within the detector of such a direct conversion type, the whole of the semiconductor element 125 corresponds to multiple X-ray detecting elements (multiple pixels), and regions of the semiconductor element 125 that are delimited in a lattice pattern by the collimators 122 and range from the incident face to the electrodes 126 each constitute an X-ray detecting element (pixel). The incident dose adjustment materials 121 may be provided on the collimators 122 in the surface of the photon counting detector 12, as shown in FIG. 8. The incident dose adjustment materials 121 may be provided between the group of pixels and the group of collimators 122 in the surface of the photon counting detector 12, as shown in FIG. 9.

The rotation frame 13 supports the X-ray source and the photon counting detector 12 in such a manner that they can rotate about the rotational axis. More specifically, the rotation frame 13 is a circular frame adapted to support the X-ray tube 11 and the photon counting detector 12 so that they face each other, and to rotate them under the control of the controller 15 as will be discussed. The rotation frame 13 is rotatably supported by a stationary frame (not illustrated) formed of metals, such as aluminum. To be more specific, the rotation frame 13 may be connected to the rim of the stationary frame via bearings. The embodiment will assume the rotational-axis direction of the rotation frame 13 in its non-tilted state or the longitudinal direction of a top 33 of the couch unit 30 to be a Z-axis direction, the axial direction orthogonal to the Z-axis direction and horizontal to the floor face to be an X-axis direction, and the axial direction orthogonal to the Z-axis direction and vertical to the floor face to be a Y-axial direction. The rotation frame 13 receives power from a drive mechanism in the controller 15 to rotate about the rotational axis extending in the Z-axis direction (rotational axis Z) at a constant angular velocity. The rotation frame 13 may be adapted to further carry and support members such as the X-ray high-voltage device 14 and the DAS 18, in addition to the X-ray tube 11 and the photon counting detector 12. The rotation frame 13 of such a configuration is accommodated in a substantially-cylindrical housing having a boar for forming an imaging space. The boar substantially conforms to a field of view (FOV). The boar has a center axis that coincides with the rotational axis Z of the rotation frame 13. The rotational axis Z of the rotation frame 13 may be called the rotational axis Z of the X-ray tube 11. Detection data generated by the DAS 18 is transmitted in an optical communication manner from a transmitter including a light-emitting diode (LED) at the rotation frame to a receiver including a photodiode at the non-rotating portion (e.g., the stationary frame) of the gantry unit, and transferred to the console unit 40. Note that the manner to send the detection data from the rotation frame to the non-rotating portion of the gantry unit is not limited to such an optical communication. Any technique may be adopted as long as it permits contactless data transmissions.

The X-ray high-voltage device 14 includes a high-voltage generator and an X-ray controller. The high-voltage generator includes electric circuitry such as a transformer and a rectifier, and has a function to generate a high voltage to be applied to the X-ray tube 11 and a filament current to be supplied to the X-ray tube 11. The X-ray controller is adapted to control output voltages in accordance with the X-rays to be emitted by the X-ray tube 11. The high-voltage generator may adopt a transformer system or an inverter system. As will be described later, the X-ray high-voltage device 14 may be controlled by processing circuitry 44 with a count rate acquisition function 443 so that the X-ray high-voltage device 14 can generate the high voltage and the filament current to cause the X-ray tube 11 to emit the X-rays according to the input count rate. The X-ray high-voltage device 14 may be provided in the rotation frame 13 or at a part of the stationary frame (not illustrated) of the gantry unit 10.

The controller 15 includes processing circuitry including a central processing unit (CPU), etc., and the aforementioned drive mechanism constituted by a motor, an actuator, etc. The processing circuitry includes, as hardware resources, one or more processors such as a CPU as mentioned and a micro processing unit (MPU), and one or more memories such as a read only memory (ROM) and a random access memory (RAM). The controller 15 may also be realized by any of an application specific integrated circuit (ASIC) and a field programmable gate array (FPGA), or other complex programmable logic device (CPLD) or simple programmable logic device (SPLD). The controller 15 controls the X-ray high-voltage device 14, the DAS 18, etc., according to commands given from the console unit 40. Each processor here reads programs stored in the memory or memories and executes them to realize the intended control. The controller 15 further has a function of controlling operations of the gantry unit 10 and the couch unit 30, in response to input signals given from an input interface 43 (described later) furnished at the console unit 40 or the gantry unit 10. For example, the controller 15 controls rotations of the rotation frame 13, tilts of the gantry unit 10, and motions of the couch unit 30 and the top 33, in response to the input signals. The controller 15 realizes the tilting control for the gantry unit 10 by rotating the rotation frame 13 about the axis that is parallel to the X-axis direction, based on tilt angle information input via the input interface 43 furnished at, for example, the gantry unit 10. The controller 15 may be provided in the gantry unit 10 or in the console unit 40. The controller 15 may be formed so that the programs are directly incorporated in the processor circuitry, instead of storing them in the memory. In this case, the processor reads the programs incorporated in its circuitry and executes them to realize the control.

The wedge 16 is a filter for adjusting the X-ray dose emitted from the X-ray tube 11. More specifically, the wedge 16 is an attenuation filter to permit the X-rays emitted from the X-ray tube 11 to pass through toward the subject P, so that the X-rays will exhibit a predetermined distribution. For example, the wedge 16 may be a filter such as a wedge filter or a bow-tie filter prepared by processing aluminum into a shape having a predetermined target angle and a predetermined thickness.

The X-ray diaphragm 17 is constituted by lead strips, etc., and adapted to limit the emission range of the X-rays having passed through the wedge 16. The X-ray diaphragm 17 forms a slit using the combination of the multiple lead strips, etc. The X-ray diaphragm 17 may be called a collimator.

The DAS 18 is adapted to acquire, for each view, electrical signals according to the energy of X-rays incident on the photon counting detector 12. The DAS 18 includes an amplifier for performing amplification processing on the electrical signals output from each X-ray detecting element of the photon counting detector 12, an A/D converter for converting the amplified electrical signals into digital signals, and a counter for counting the digital signals for each energy region. The counter includes a wave-height discriminator adapted to output a unique pulse in response to the input of a signal that exceeds a predesignated amplitude. The counter obtains the number of X-ray photons for each of multiple energy regions by counting the number of such unique pulses output from the wave-height discriminator. The number of photons for each energy region is summed up for each view and channel by channel. In the following description, the number of photons for each energy region, summed for each view, will be called a count number. The term "count number" may be replaced with "count value". The DAS 18 generates detection data that contains the count number for each energy region. The detection data may be a set of a channel number and a row number of the originating X-ray detecting element, a view number indicative of the acquired view, a code indicative of the energy region, and the count number. The view number may discretionarily be based on the order of view acquisition performed (acquisition time), or use the number representing the rotational angle of the X-ray tube (e.g., 1 to 1000). The detection data generated by the DAS 18 is sent to the console unit 40 via contactless data transmission circuitry (not illustrated) provided in the gantry unit 10. The DAS 18 is one example of a data acquisition circuit.

The couch unit 30 is a unit adapted to movably carry thereon the subject P as a scan subject, and includes a base 31, a couch driver 32, the aforementioned top 33, and a support frame 34.

The base 31 is a housing adapted to support the support frame 34 in such a manner that the support frame 34 can move vertically.

The couch driver 32 is a motor or an actuator adapted to move the top 33, on which the subject P is placed, in the longitudinal direction of the top 33. The couch driver 32 moves the top 33 under the control of the console unit 40 or the controller 15. For example, the couch driver 32 moves the top 33 in a direction orthogonal to the subject P placed on the top 33 so that the body axis of the subject P coincides with the center axis of the boar of the rotation frame 13. The couch driver 32 may also move the top 33 along the body-axis direction of the subject P, according to the X-ray CT imaging performed with the gantry unit 10.

The top 33 is provided on the upper side of the support frame 34, and may be a plate on which the subject P is placed. Note that the couch driver 32 may be adapted to move not only this top 33 but also the support frame 34 in the longitudinal direction of the top 33.

The console unit 40 includes a memory 41, a display 42, the aforementioned input interface 43, the aforementioned processing circuitry 44, and a communication interface 45. The memory 41, the display 42, the input interface 43, the processing circuitry 44, and the communication interface 45 are adapted to perform data communications with one another via a bus. Note that while the description assumes the console unit 40 to be a member separate from the gantry unit 10, the console unit 40 may be incorporated into the gantry unit 10, or its components may be partially included in the gantry unit 10.

The memory 41 is realized by, for example, a semiconductor memory device such as a random access memory (RAM) or a flash memory, or a hard disk, an optical disk, etc. More specifically, the memory 41 includes a memory main component for storing electric information, and peripheral circuitry such as a memory controller and a memory interface pertaining to the memory main component. The memory 41 stores, for example, projection data and medical image data. The memory 41 also stores control programs, a variety of data, tables, etc., according to the embodiment. The control programs according to the embodiment are read and executed by, for example, a processor in the processing circuitry 44.

Figure 10:
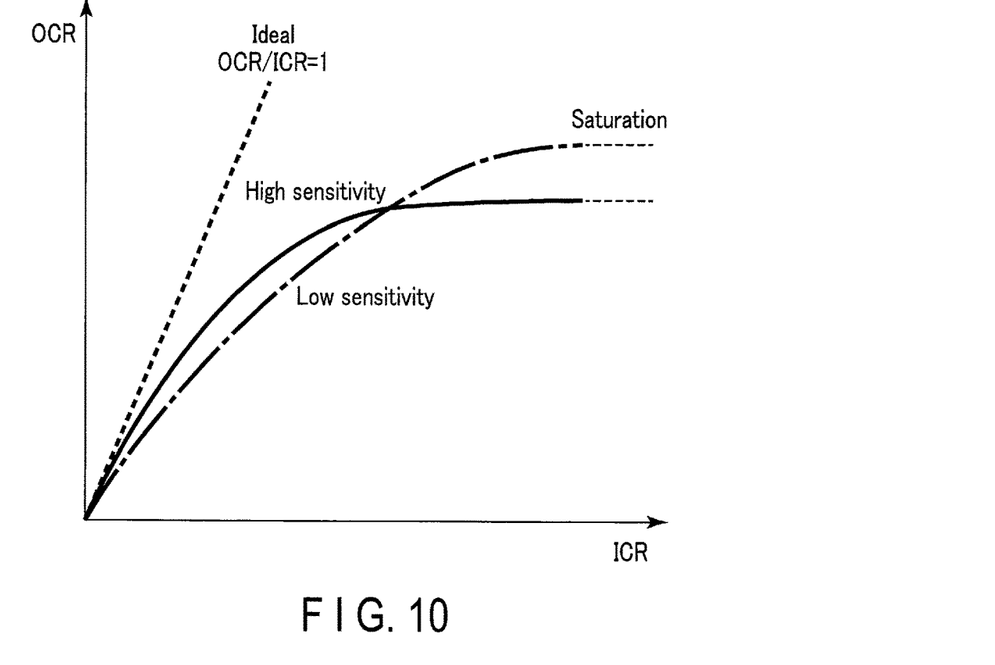
FIG. 10 is a graph for explaining pixel-by-pixel sensitivity variations in the photon counting detector according to the embodiment.
Figure 11:
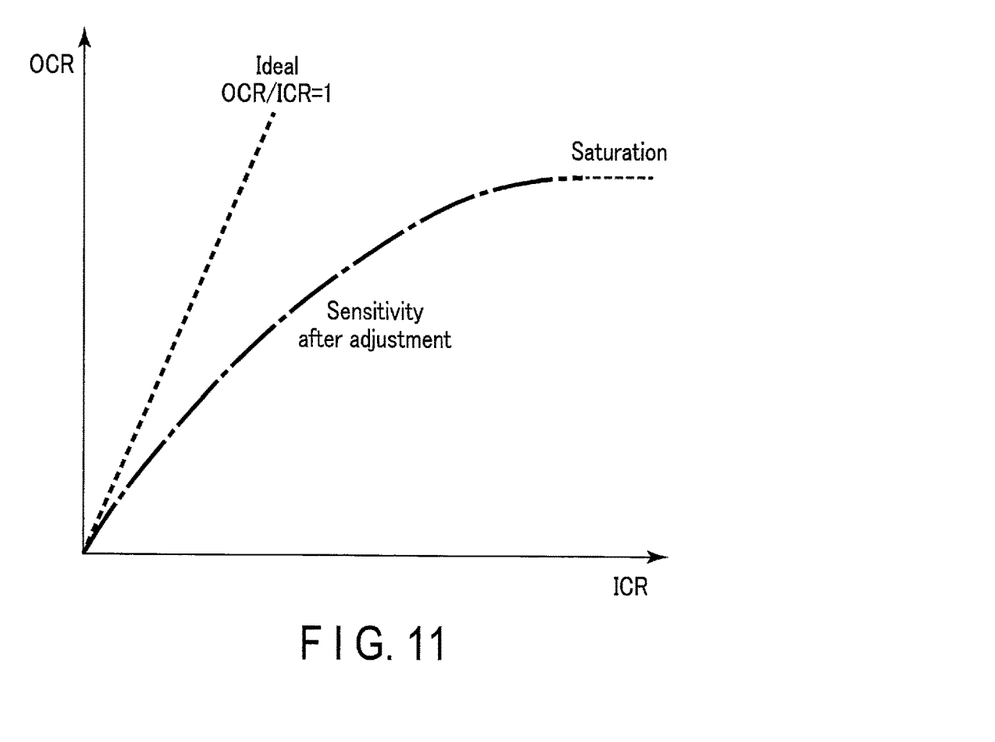
FIG. 11 is a graph for explaining sensitivity having been adjusted by a sensitivity correction method according to the embodiment.
Figure 12:
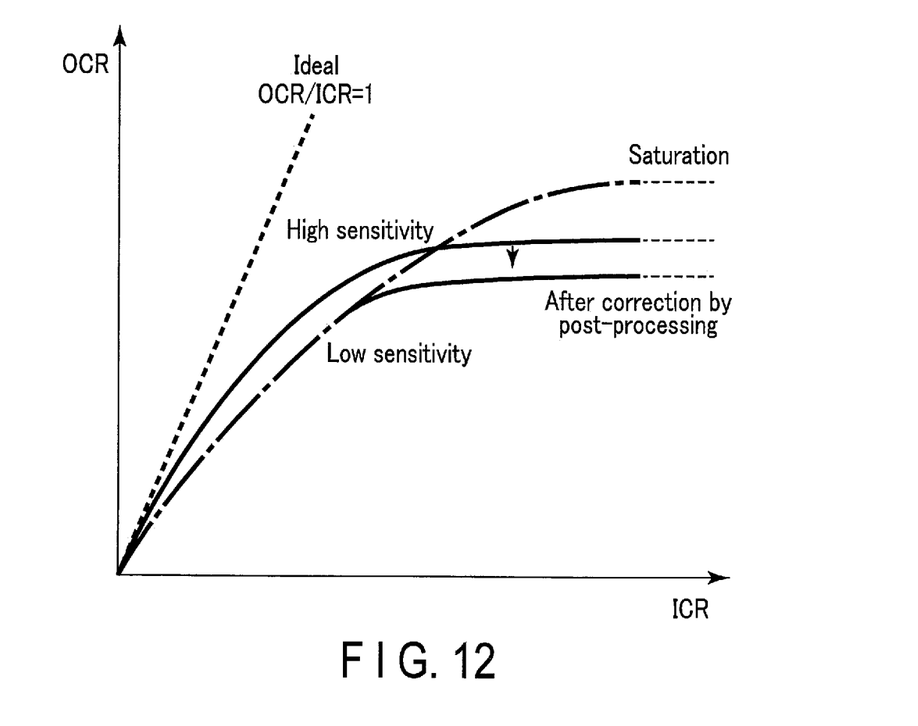
FIG. 12 is a graph for explaining sensitivity of a standard photon counting detector, having been corrected through gain correction technique.

Examples of the data according to the embodiment include data as shown in FIG. 10 that is indicative of the relationship between the input count rate (ICR) and each pixel's output count rate (OCR) before the incident dose adjustment materials 121 are provided. FIG. 10 shows an output characteristics curve obtained from a pixel having high sensitivity and another output characteristics curve obtained from a pixel having low sensitivity, making the pixel-by-pixel sensitivity variations recognizable. Also, the data according to the embodiment may include data as shown in FIG. 11 that is indicative of the relationship between the input count rate (ICR) and each pixel's output count rate (OCR) after the incident dose adjustment materials 121 are provided. FIG. 11 shows that the output characteristics curve obtained from the pixel having high sensitivity substantially agrees with the output characteristics curve obtained from the pixel having low sensitivity, and it can be understood from it that lowering the sensitivity of the highly sensitive pixel has addressed the pixel-by-pixel sensitivity variations. In this relation, FIG. 12 shows an instance where the gain correction as a post-processing technique has been employed instead of providing the incident dose adjustment materials 121. In this instance, as seen from FIG. 12, a non-linear profile stands out from the low ICR point on the gain-corrected output characteristics curve of a pixel having high sensitivity, and this output characteristics curve also incurs a low OCR saturation value.

Figure 13:
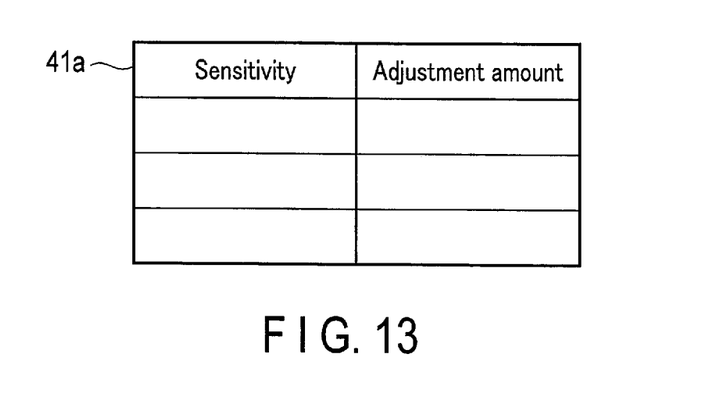
FIG. 13 is a schematic diagram for explaining a table for the sensitivity correction method according to the embodiment.

The tables according to the embodiment include a table 41a that stores, for example, values of the sensitivities of the pixels constituting the photon counting detector 12 and the adjustment amounts of the incident dose adjustment materials 121 in association with each other, as shown in FIG. 13. Each sensitivity here may be represented by the inclination (=OCR/ICR) of an applicable output characteristics curve as discussed above, or may be an angle (=tan ^(−1)(OCR/ICR), the symbol "^" indicating exponentiation) of the output characteristics curve. Each adjustment amount here may be a thickness, a size of the corresponding opening window 121w, or an opening ratio, as described above. The size of each opening window 121w may be called the opening dimensions of each opening window 121w. As such, the table 41a may be handled as a table of conversion from a sensitivity into a thickness, or a table of conversion from a sensitivity into opening dimensions (or an opening ratio). The table 41a may be prepared and stored in the memory 41 in advance.

The memory 41 may have its storage region within the X-ray CT apparatus 1 or within an external storage device connected via a network. The memory 41 may be called a storage.

The display 42 is adapted to display various information. For example, the display 42 outputs medical images (CT images) generated by the processing circuitry 44, graphical user interfaces (GUIs) for accepting various operations from an operator, and so on. For example, the display 42 may be a liquid crystal display or a cathode ray tube (CRT) display. Also, the display 42 includes a display main part for displaying medical images, etc., internal circuitry for supplying display signals to the display main part, and peripheral circuitry including connectors, cables, etc., for connection between the display main part and the internal circuitry. The display 42 may be provided at the gantry unit 10. The display 42 may be a desktop type, or implemented as a tablet terminal capable of wireless communications with the main part of the console unit 40.

The input interface 43 is adapted to receive various input operations from an operator and converts the received input operations into electrical signals for output to the processing circuitry 44. For example, the input interface 43 accepts acquisition conditions to apply when acquiring projection data, reconstruction conditions to apply when reconstructing CT images, image-processing conditions to apply when generating post-processed images from CT images, and so on, from an operator. The input interface 43 is realized by, for example, an input device constituted by a mouse, a keyboard, a trackball, switches, buttons, a joystick, a touch panel, etc., and internal circuitry for outputting electrical signals from the input device to the processing circuitry 44. The input interface 43 may be provided at the gantry unit 10. The input interface 43 may also be implemented as a tablet terminal, etc. capable of wireless communications with the main part of the console unit 40.

The processing circuitry 44 takes total control over the X-ray CT apparatus 1 according to the electrical signals associated with the input operations, output from the input interface 43. For example, the processing circuitry 44 includes, as hardware resources, one or more processors such as a CPU, an MPU, a graphics processing unit (GPU), etc., and one or more memories such as a ROM a RAM, etc. The processing circuitry 44 implements a system control function 441, an image generation function 442, the aforementioned count rate acquisition function 443, an adjustment amount acquisition function 444, a scan control function 445, a display control function 446, etc., using the processor adapted to run programs loaded into the memory.

The system control function 441 controls each function of the processing circuitry 44 based on the input operations accepted from an operator via the input interface 43. More specifically, the system control function 441 reads the control program stored in the memory 41, loads it into the memory in the processing circuitry 44, and controls each component of the X-ray CT apparatus 1 according to the loaded control program.

The image generation function 442 performs preprocessing, such as logarithmic conversion, offset correction, inter-channel gain correction, and beam hardening correction, on the detection data output from the DAS 18 to generate preprocessed data. Note that the data before the preprocessing (detection data) and the data after the preprocessing may be generically called projection data. The image generation function 442 also generates CT image data by subjecting such projection data to reconstruction processing adopting filtered back-projection technique, iterative approximation reconstruction technique, etc.

The image generation function 442 converts the generated CT image data into tomographic data of a given section, volume data, etc., through the known technique based on the input operations accepted from an operator via the input interface 43. The volume data refers to data containing information on the distribution of CT values in a 3D space. The tomographic data, volume data, etc., after the conversion are displayed on the display 42 as monitoring images and volume images. The monitoring images may be tomographic images during imaging operations for monitoring. As the known technique for conversion, for example, the 3D image processing such as volume rendering, surface rendering, image-value projective processing, multi-planer reconstruction (MPR) processing, and curved MPR (CPR) processing may be discretionarily adopted.

The count rate acquisition function 443 acquires the count rate for each pixel of the photon counting detector 12. For example, the count rate acquisition function 443 acquires each pixel's output count rate (OCR) for each input count rate (ICR) of the radiations incident on the photon counting detector 12.

The adjustment amount acquisition function 444 acquires the adjustment amount for each pixel based on the count rates for the respective pixels so that the sensitivities of the pixels are uniformized. For example, the adjustment amount acquisition function 444 may acquire the sensitivity of each pixel based on the relationship between the input count rate and each pixel's output count rate having been measured. The adjustment amount acquisition function 444 may then determine the adjustment amount by searching the table 41a in which sensitivities and adjustment amounts are associated, using the acquired sensitivity. The "searching" action here is intended to include an option of determining a search result to be the adjustment amount, an option of performing a calculation process using search results and then determining the calculation result to be the adjustment amount, and so on. For example, when it is found that the table 41a contains an entry equal to the acquired sensitivity, the result obtained by searching the table 41a using the acquired sensitivity may be determined to be the adjustment amount. Also, for example, if it is found that the acquired sensitivity falls between two entries of sensitivities in the table 41a, an interpolation calculation may be performed using the two adjustment amounts obtained from the table 41a for such two sensitivity entries, and the result of this calculation may be determined to be the adjustment amount for the acquired sensitivity.

The adjustment amount acquisition function 444 may also have a function to prepare, based on the adjustment amounts determined for the respective pixels, blueprint data for preparing the incident dose adjustment materials 121 for the respective pixels. For example, if use of the 3D fabricator 50 is intended for preparation of the incident dose adjustment materials 121, the blueprint data may contain a standard triangulated language (STL) file as the information indicative of the shape of each incident dose adjustment material 121, which will be described in more detail later.

The scan control function 445 acquires positioning image data for the subject P, for setting a scan range, a region of interest, imaging conditions, etc. Examples of the imaging conditions include the tube voltages and tube currents for the X-ray tube 11, the amount of movement of the couch in one rotation with respect to the total width of image slices obtained (i.e., imaging pitch), the timing to start imaging, the number of imaging scan lines, the rate of rotation, etc. The scan control function 445 controls the imaging system to sequentially perform an imaging operation for monitoring and main scanning.

The display control function 446 controls the display 42 to present displays of data based on the processing results of each function, etc. For example, the display control function 446 causes the display 42 to display a medical image based on the medical image data. The display control function 446 may be called display control circuitry.

Note that the system control function 441, the image generation function 442, the count rate acquisition function 443, the adjustment amount acquisition function 444, the scan control function 445, and the display control function 446 may be implemented by the processing circuitry 44 as one circuitry component on a single circuit board, or may be implemented by the processing circuitry 44 as multiple or respective circuitry components on different circuit boards. Similarly, while the description has assumed that the console unit 40 performs multiple functions as a single console, the console unit 40 may be constituted by separate consoles to perform the multiple functions.

The communication interface 45 is circuitry adapted for communications with external devices through cables or wirelessly, or through the combination of cable and wireless means. This embodiment assumes the 3D fabricator 50 as one example of the external devices, but the external devices are not limited to specific types. The external devices may include, for example, a modality, an image processing apparatus, a server in a system such as a radiological information system (RIS), a hospital information system (HIS), and a picture archiving and communication system (PACS), and other workstations, etc.

The 3D fabricator 50 is adapted to prepare the incident dose adjustment materials 121 having the adjustment amounts for the respective pixels. Examples of this 3D fabricator 50 include the known 3D printer for making 3D structures. The 3D fabricator 50 may be of any type as long as it can form 3D structures, and may discretionarily employ any techniques including, for example, a powder bed fusion or powder lamination technique, a directed energy deposition technique, a 3D screen printing technique, and so on. The 3D fabricator 50 makes (prepares) the incident dose adjustment materials 121 as 3D structures, based on blueprint data received from an outside entity, e.g., the X-ray CT apparatus 1. As mentioned, the blueprint data may contain a standard triangulated language (STL) file as the information indicative of the shape of each incident dose adjustment material 121. This STL file is widely employed in the field of 3D printers, and has a data structure to approximately express a shape by the set of small triangles called facets. An STL file contain the vector data of normal lines and coordinates of triangle vertices for each facet. Note that the blueprint data is not limited to inclusion of such an STL file, but may discretionarily contain files of any format adopted in the field of 3D printers, such as the initial graphics exchange specification (IGES) and the standard for the exchange of product model data (STEP), for example. Also, the blueprint data may contain information indicative of metal powder for forming each incident dose adjustment material 121. The metal powder may be any powder applicable to a 3D printer, such as, for example, tungsten powder, molybdenum powder, aluminum powder, stainless steel powder, or any combination thereof. If the 3D fabricator 50 is adapted to deal with only one type of metal powder, the information to indicate metal powder may be omitted.

Figure 14:
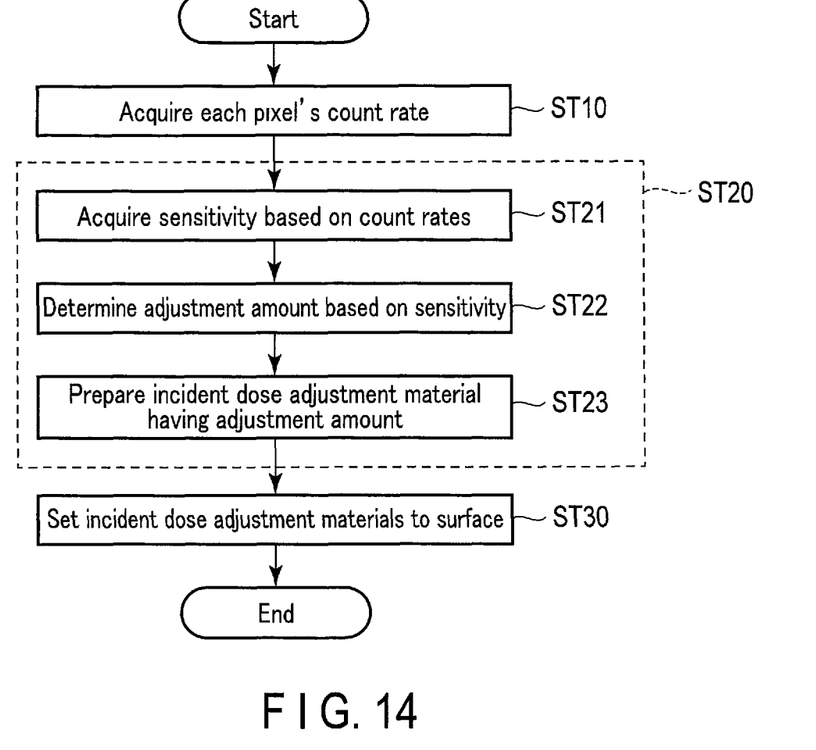
FIG. 14 is a flowchart for explaining the sensitivity correction method according to the embodiment.
Figure 15:
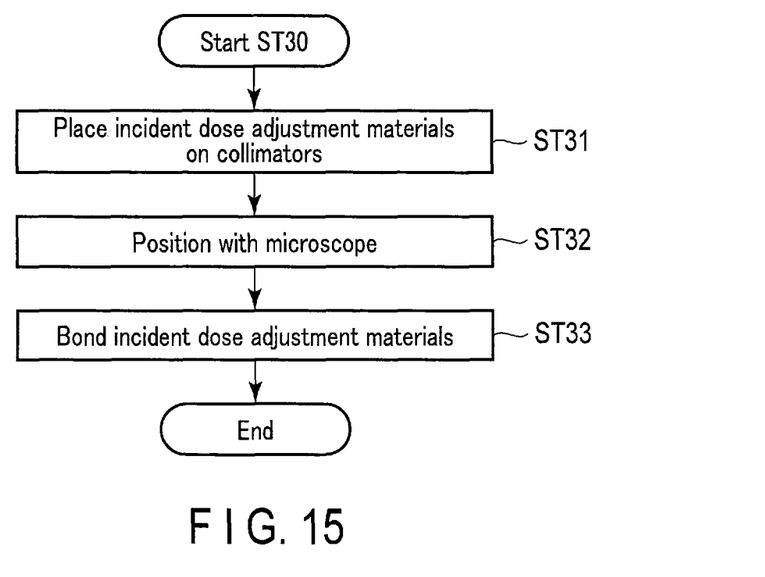
FIG. 15 is a flowchart giving exemplary contents of step ST30 in FIG. 14.
Figure 16:
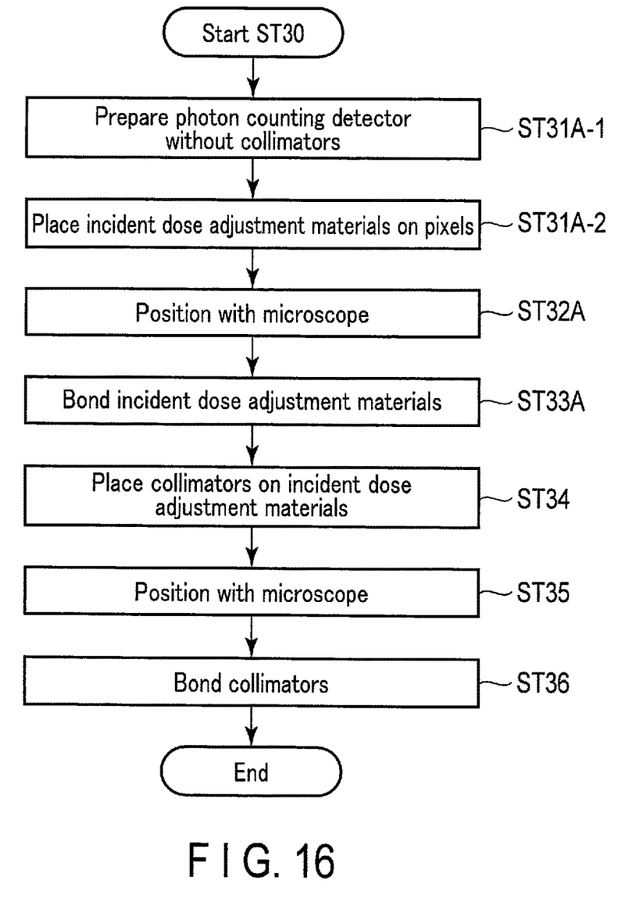
FIG. 16 is a flowchart giving other exemplary contents of step ST30 in FIG. 14.

The sensitivity correction method for the photon counting detector in the X-ray CT apparatus configured as above will be described with reference to the flowcharts in FIGS. 14 to 16.

It will be assumed that the X-ray CT apparatus 1 and the photon counting detector 12, at the outset, are under the following conditions (a) to (e).

(a) The photon counting detector 12 includes the collimators 122 in its surface, but does not include the incident dose adjustment materials 121.

(b) There are no subject P or phantom, etc. on the top 33.

(c) The memory 41 stores the table 41a.

(d) The rotation frame 13 of the gantry unit 10 is still.

(e) The X-ray photons incident on the surface of the photon counting detector 12 give a uniform input count rate per unit area.

Under these conditions, step ST10 is performed, in which the processing circuitry 44 with the count rate acquisition function 443 acquires the count rate for each pixel in the photon counting detector 12 by controlling the imaging system. For example, the processing circuitry 44 controls the imaging system so that projection data based on the output count numbers of all the pixels in the photon counting detector 12 is acquired for each input count rate (ICR) of the radiations incident on the photon counting detector 12. Then, for a given input count rate, the processing circuitry 44 calculates projection data that is based on the count numbers per unit time, by dividing the acquired projection data by the imaging time spent for the same. As the count number per unit time being a count rate, this projection data after the calculation corresponds to the data containing the sequence of output count rates for all the pixels, arranged according to the respective pixel positions. As such, the calculated projection data allows for the acquisition of each pixel's count rate (OCR) for the given input count rate. Subsequently, each pixel's count rate is acquired in the similar manner for the remaining input count rates. Accordingly, the processing circuitry 44 acquires each pixel's count rate, for each input count rate of the radiations incident on the photon counting detector 12.

After step ST10, step ST20 is performed by the X-ray CT apparatus 1 and the 3D fabricator 50 for providing the incident dose adjustment materials 121 for the respective pixels. This step ST20 is constituted by steps ST21 and 22 performed by the X-ray CT apparatus 1, and step ST23 performed by the 3D fabricator 50.

In steps ST21 to ST22, the processing circuitry 44 with the adjustment amount acquisition function 444 acquires the adjustment amount for each pixel based on the count rates for the respective pixels, so that the sensitivities of the pixels will be uniformized. More specifically, the processing circuitry 44 acquires the sensitivity of each pixel based on the relationship between the input count rate and each pixel's count rate having been acquired (step ST21). The sensitivity of each pixel may be calculated as, for example, an inclination at the point of origin in the graph as shown in FIG. 10. The photon counting detector 12 before being furnished with the incident dose adjustment materials 121 involves pixel-by-pixel sensitivity variations as shown in FIG. 10, due to manufacturing errors, etc. related to electrode areas, opening dimensions, or the like.

Then, the processing circuitry 44 determines the adjustment amount by searching the table 41a in the memory 41, using the acquired sensitivity (step ST22). In this step ST22, the processing circuitry 44 determines, for example, the result obtained by searching the table 41a to be the adjustment amount. Where applicable, the processing circuitry 44 determines, for example, the result obtained by performing interpolation calculation using the search results from the table 41a, to be the adjustment amount. The adjustment amount may be a thickness according to the sensitivity, or opening dimensions according to the sensitivity. The description will assume the case of the adjustment amount being opening dimensions.

The processing circuitry 44 with the adjustment amount acquisition function 444 prepares, based on the adjustment amounts determined for the respective pixels, blueprint data for preparing the incident dose adjustment materials 121 for the respective pixels. The blueprint data contains, for example, an STL file indicative of the shape of each incident dose adjustment material 121. The processing circuitry 44 sends this blueprint data to the 3D fabricator 50 via the communication interface 45.

In step ST23, the 3D fabricator 50 prepares the incident dose adjustment materials 121 each having the adjustment amount for the corresponding pixel, based on the blueprint data received from the X-ray CT apparatus 1. For example, the 3D fabricator 50 forms each incident dose adjustment material 121 having the opening dimensions according to the corresponding pixel as shown in FIG. 5, based on the blueprint data and from tungsten powder. Step ST20 is thus finished.

In step ST30, the incident dose adjustment materials 121 prepared in step ST20 are set to the surface of the photon counting detector 12. This embodiment assumes an instance where the incident dose adjustment materials 121 are provided on the collimators 122 currently constituting the surface of the photon counting detector 12. This step ST30 proceeds with, for example, steps ST31 to ST33 shown in FIG. 15. Specifically, the gantry unit 10 is uncovered to expose the photon counting detector 12. In this state, an adhesive is applied over the whole or part of the top faces of the collimators 122. The adhesive here may be of any type as long as it can bond metals. The incident dose adjustment materials 121 are then placed on the collimators 122 of the photon counting detector 12 (step ST31). This placement is performed with the aid of a retainer (not illustrated) adapted to hold each of the incident dose adjustment materials 121 or the set of the incident dose adjustment materials 121 altogether when they are constituted as one material sheet. If a fast-acting adhesive is employed, the incident dose adjustment materials 121 are located with a space from the collimators 122. If a thermosetting adhesive is employed, the incident dose adjustment materials 121 are arranged in contact with the collimators 122. Note that each or the aggregated sheet of the incident dose adjustment materials 121 may include multiple retention parts on the outer circumference, so that the retainer can hold the incident dose adjustment materials 121 through such parts.

After step ST31, positioning of the incident dose adjustment materials 121, present on or above the collimators 122, is performed using a microscope (step ST32). To this end, each or the applicable ones of the incident dose adjustment materials 121 may include a positioning marker formed in advance. Optionally, or instead of such markers, the set of the incident dose adjustment materials 121 may have the maximum-size opening window 121w at each of the four corners irrespective of the acquired sensitivities, so that these opening windows 121w at the four corners can be utilized as markers.

After step ST32, the positioned incident dose adjustment materials 121 are fixed to the top faces of the collimators 122 by the adhesive (step ST33). The incident dose adjustment materials 121 are therefore set to the surface of the photon counting detector 12 as shown in FIG. 6 or FIG. 8, and step ST30 comes to the end.

The gantry unit 10 is then covered, making the X-ray CT apparatus 1 ready to operate. Now, the X-rays emitted toward the photon counting detector 12 are incident on the photon counting detector 12 through the opening windows 121w of the incident dose adjustment materials 121, differing in size for the respective pixels. As such, the input count rate for each pixel is physically adjusted, and therefore, the pixel-by-pixel sensitivity variations in the photon counting detector 12 are corrected.

As appreciated from the foregoing, the certain embodiments disclosed herein include the features of acquiring a count rate for each pixel in a photon counting detector, preparing incident dose adjustment materials for the respective pixels based on the count rates for the pixels, and providing the prepared incident dose adjustment materials in the surface of the photon counting detector.

With these features, therefore, radiations will enter the photon counting detector through the incident dose adjustment materials tailored for the respective pixels, so that the issue of pixel-by-pixel sensitivity variations in the photon counting detector can be resolved. The embodiments can realize the photon counting detector without pixel-by-pixel sensitivity variations. Accordingly, the embodiments can provide photon counting CT apparatuses capable of generating reconstructed images without artifacts. To be more specific, pixel-by-pixel sensitivity variations hamper reconstruction processing. Each embodiment corrects the pixel-by-pixel sensitivity variations, and thus improves the convenience in reconstruction processing and simplifies the correction procedures in the reconstruction processing (the reconstruction processing that takes into account the pixel-by-pixel sensitivity variations incurs a high computation load). Consequently, the embodiments allow for the generation of reconstructed images without artifacts.

Also according to one embodiment, the feature of preparing incident dose adjustment materials may include acquiring, based on the count rates for the respective pixels, an adjustment amount for each pixel in order to uniformize the sensitivities of the pixels, and preparing the incident dose adjustment materials having the respective adjustment amounts for the corresponding pixels. In this case, the embodiment allows for the preparation of the incident dose adjustment materials each having the adjustment amount according to the sensitivity of the corresponding pixel.

According to one embodiment, the feature of acquiring a count rate may be acquiring each pixel's count rate for each input count rate of the radiations incident on the photon counting detector. Also, acquiring the adjustment amount may include acquiring a sensitivity of each pixel based on the relationship between the input count rate and each pixel's count rate having been acquired, and determining the adjustment amount by searching, based on the acquired sensitivity, a table that associates sensitivity values with adjustment amounts. In this case, the embodiment allows for the easy determination of the adjustment amount according to the sensitivity of each pixel.

According to one embodiment, the adjustment amount may be a thickness. In this case, the embodiment allows for the easy preparation of the incident dose adjustment materials from light metal materials.

According to one embodiment, the adjustment amount may be a size of an opening window, or an opening ratio. In either of these options, the embodiment lets the incident radiations pass through the opening windows, and therefore provides an advantage of producing no energy shift in the radiations.

According to one embodiment, the feature of preparing incident dose adjustment materials may include forming the incident dose adjustment materials having appropriate adjustment amounts by use of a 3D fabricator. In this case, the embodiment allows the incident dose adjustment materials to be prepared more easily than the instance of adopting a method of punching a metal plate to form an opening window of the size according to the adjustment amount.

Moreover, according to one embodiment, the incident dose adjustment materials may be provided on the collimators so as to constitute the surface of the photon counting detector. Even when the incident dose adjustment materials are provided in such a manner, the embodiment can secure the same effects as discussed.

[First Modification]

Next, a first modification of the foregoing embodiments will be described. This first modification is an example where the step of bonding the incident dose adjustment materials 121 onto the collimators 122 as shown in FIG. 15 is replaced with the step of sequentially bonding, on the pixels on the top part, the incident dose adjustment materials 121 and the collimators 122 as shown in FIG. 16. Accordingly, the photon counting detector 12 here has a structure as shown in FIG. 7 or FIG. 9, in which the incident dose adjustment materials 121 are set between the pixels and the collimators 122.

The remaining aspects are the same as those described for the foregoing embodiments.

According to the first modification as such, steps ST10 to ST20 are performed in a manner similar to the foregoing embodiments.

In step ST30, the incident dose adjustment materials 121 prepared in step ST20 are set between the pixels and the collimators 122 in the photon counting detector 12. This step ST30 proceeds with, for example, steps ST31A-1 to ST36 shown in FIG. 16. Specifically, the gantry unit 10 is uncovered to expose the photon counting detector 12. In this state, the collimators 122 in the surface portion of the photon counting detector 12 are detached. In this detachment process, an adhesive on the collimators 122 is removed by, for example, spraying a solvent or performing a heat treatment. The photon counting detector 12 without the collimators 122 is thus prepared (step ST31A-1). Note that, for the sake of easy detachment of the collimators 122, the amount of adhesive originally used for the collimators 122 may be suppressed as compared to the amount of adhesive which will be used for completion. That is, up until step ST31A-1, the fixation of the collimators 122 may be done as a tentative fixation with a small amount of adhesive.

After step ST31A-1, an adhesive is applied over the whole or part of the back faces of the incident dose adjustment materials 121. The incident dose adjustment materials 121 are then placed on the pixels at the top part of the photon counting detector 12 (step ST31A-2). This placement is performed with the aid of a retainer (not illustrated) adapted to hold each of the incident dose adjustment materials 121 or the set of the incident dose adjustment materials 121 altogether when they are constituted as one material sheet. If a fast-acting adhesive is employed, the incident dose adjustment materials 121 are located with a space from the pixels at the top part. If a thermosetting adhesive is employed, the incident dose adjustment materials 121 are arranged in contact with the pixels at the top part. Note that each or the aggregated sheet of the incident dose adjustment materials 121 may include multiple retention parts on the outer circumference, so that the retainer can hold the incident dose adjustment materials 121 through such parts.

After step ST31A-2, positioning of the incident dose adjustment materials 121, present on or above the pixels, is performed using a microscope (step ST32A). The incident dose adjustment materials 121 may include positioning markers as discussed above.

After step ST32A, the positioned incident dose adjustment materials 121 are fixed onto the pixels of the photon counting detector 12 by the adhesive (step ST33A).

After step ST33A, an adhesive is applied over the whole or part of the proximal (bottom) faces of the collimators 122. The collimators 122 are then placed on the incident dose adjustment materials 121 of the photon counting detector 12 (step ST34). This placement is performed with the aid of a retainer (not illustrated) adapted to hold the collimators 122. If a fast-acting adhesive is employed, the collimators 122 are located with a space from the incident dose adjustment materials 121. If a thermosetting adhesive is employed, the collimators 122 are arranged in contact with the incident dose adjustment materials 121.

After step ST34, positioning of the collimators 122, present on or above the incident dose adjustment materials 121, is performed using a microscope (step ST35). For this purpose, as well, the incident dose adjustment materials 121 may include markers as discussed above.

After step ST35, the positioned collimators 122 are fixed to the top faces of the incident dose adjustment materials 121 by the adhesive (step ST36). The incident dose adjustment materials 121 are therefore set between the pixels and the collimators 122 in the photon counting detector 12 as shown in FIG. 7 or FIG. 9, and step ST30 comes to the end. The gantry unit 10 is then covered, making the X-ray CT apparatus 1 ready to operate. Now, the X-rays emitted toward the photon counting detector 12 from the X-ray tube 11 enter the photon counting detector 12 through the collimators 122, and also through the opening windows 121*w* of the incident dose adjustment materials 121, differing in size for the respective pixels. As such, the input count rate for each pixel is physically adjusted, and therefore, the pixel-by-pixel sensitivity variations in the photon counting detector 12 are corrected.

According to the first modification with the structure described above, in which the incident dose adjustment materials 121 are provided between the pixels and the collimators 122 in the photon counting detector 12, the same effects as in the foregoing embodiments can be obtained.

[Second Modification]

Figure 17:
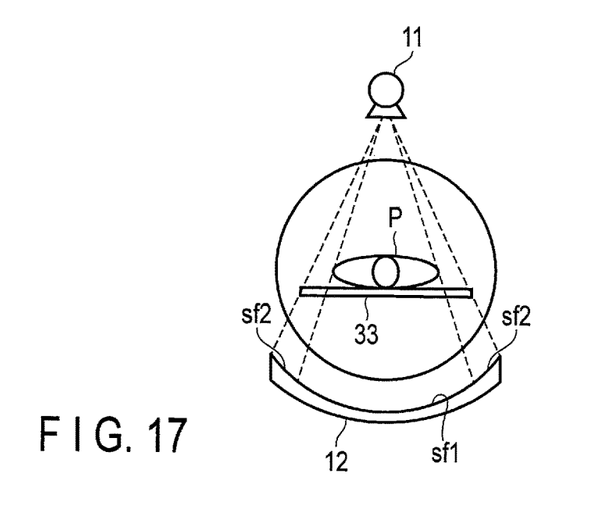
FIG. 17 is a schematic diagram for explaining a modification of the embodiment.

Next, a second modification of the embodiments will be described. This second modification is an example where the incident dose adjustment materials 121 are provided on one or more partial regions in the surface of the photon counting detector 12. More specifically, and for example, the second modification provides the incident dose adjustment materials 121 on a first region sf1 or second regions sf2 constituting the surface of the photon counting detector 12 as shown in FIG. 17, instead of providing the incident dose adjustment materials 121 on both the first region sf1 and the second regions sf2. Note, however, that the second modification is not limited to this exemplary structure.

The first region sf1 here may be, among the whole surface region of the photon counting detector 12, a region that receives the X-rays transmitted through the subject P and that occupies the center portion in the channel direction.

The second regions sf2 may be, among the whole surface region of the photon counting detector 12, regions that are different from the first region sf1 and that occupy the respective, two end portions in the channel direction.

The remaining aspects are the same as those described for the foregoing embodiments.

With the above structure, in which the incident dose adjustment materials 121 are provided on one or more partial regions in the surface of the photon counting detector 12, it is possible to simplify some of the steps in the sensitivity correction method, in addition to obtaining the same effects as in the foregoing embodiments. To be more specific, according to the second modification, the area to set the incident dose adjustment materials 121 is reduced as compared to the case of setting the incident dose adjustment materials 121 to the entire surface of the photon counting detector 12. As such, it is possible to reduce the execution time for at least steps ST22 to ST30 among steps ST10 to ST30.

For example, if the positions or borders for the first region sf1 and the second regions sf2 are predetermined, steps ST10 to ST30 may be performed for only the subject region or regions, and therefore, the time required to perform steps ST10 to ST30 can be reduced.

If the positions or borders for the first region sf1 and the second regions sf2 are not determined yet, steps ST10 to ST21 are performed for the entire surface, and the positions for the first region sf1 or the second regions sf2 are determined from the results of step ST21 in such a manner that the portion involving large sensitivity variations will be included in the first region sf1 or the second regions sf2. Subsequently, steps ST22 to ST30 are performed for only the first region sf1 as a subject region, or the second regions sf2 as subject regions. As such, the time required to perform steps ST22 to ST30 can be reduced.

Note that when, as in this instance, the region to provide the incident dose adjustment materials 121 is not determined in advance, use of the first region sf1 and the second regions sf2 is optional. For example, instead of adopting the first region sf1 and the second regions sf2, it is possible to determine the positions for a region involving large sensitivity variations from the results of step ST21, and perform steps ST22 to ST30 for only this region, so that the execution time for steps ST22 to ST30 will be reduced. In this case, a set of the incident dose adjustment materials 121, forming a contour conforming to the region involving large sensitivity variations, is provided to cover the region. The incident dose adjustment materials 121 here, intended for the partial region of an irregular shape, may be called a tile member or a patch member.

According to the second modification, moreover, providing the incident dose adjustment materials 121 on the first region sf1 in the surface can correct the pixel-by-pixel sensitivity variations in the center portion, where artifacts often occur. Thus, artifacts in reconstructed images can be suppressed.

Also, providing the incident dose adjustment materials 121 on the second regions sf2 in the surface can correct the pixel-by-pixel sensitivity variations in the end portions. Thus, when pixels in the end portions vary sensitivity to a certain extent, artifacts in reconstructed images can be suppressed.

According to any of the one or more embodiments in the foregoing description, the pixel-by-pixel sensitivity variations in photon counting detectors can be corrected.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A sensitivity correction method, comprising:
   acquiring count rates for respective pixels in a photon counting detector;
   preparing incident dose adjustment materials for the respective pixels based on the count rates for the respective pixels; and
   providing the incident dose adjustment materials in a surface of the photon counting detector.

2. The sensitivity correction method according to claim 1, wherein the preparing the incident dose adjustment materials comprises
   acquiring adjustment amounts for the respective pixels based on the count rates for the respective pixels, for uniform pixel sensitivities, and
   preparing the incident dose adjustment materials having the adjustment amounts for the respective pixels.

3. The sensitivity correction method according to claim 2, wherein
   the acquiring the count rates for the respective pixels comprises acquiring the count rates for each input count rate of radiations incident on the photon counting detector, and
   the acquiring the adjustment amounts comprises
      acquiring sensitivities of the respective pixels based on a relationship between the input count rate and the count rates, and
      determining the adjustment amounts by searching a table in which values of the sensitivities and the adjustment amounts are associated, using the acquired sensitivities.

4. The sensitivity correction method according to claim 2, wherein the adjustment amounts are values in thickness.

5. The sensitivity correction method according to claim 2, wherein the adjustment amounts are values in size of opening windows.

6. The sensitivity correction method according to claim 2, wherein the preparing the incident dose adjustment materials comprises forming the incident dose adjustment materials according to the adjustment amounts, using a 3D fabricator.

7. A photon counting detector comprising incident dose adjustment materials based on count rates for respective pixels and adapted to form a surface of the photon counting detector.

8. The photon counting detector according to claim 7, wherein the incident dose adjustment materials have adjustment amounts for the respective pixels, for uniformity among pixel sensitivities which are based on the count rates for the respective pixels.

9. The photon counting detector according to claim 8, wherein the adjustment amounts are values in thickness.

10. The photon counting detector according to claim 8, wherein the adjustment amounts are values in size of opening windows.

11. The photon counting detector according to claim 7, further comprising collimators, wherein the incident dose adjustment materials are on the collimators.

12. The photon counting detector according to claim 7, further comprising collimators, wherein the incident dose adjustment materials are between the respective pixels and the collimators.

13. A photon counting detector comprising incident dose adjustment materials having film shapes differing in thickness for respective pixels, the incident dose adjustment materials being on radiation incident sides of the respective pixels.

14. A photon counting detector comprising incident dose adjustment materials differing in opening ratio for respective pixels, the incident dose adjustment materials being on radiation incident sides of the respective pixels.

* * * * *